United States Patent [19]

Butterworth

[11] 4,116,840

[45] Sep. 26, 1978

[54] LIQUID TREATMENT APPARATUS

[75] Inventor: Donald James Butterworth, Stirling, N.J.

[73] Assignee: Ecodyne Corporation, Lincolnshire, Ill.

[21] Appl. No.: 824,005

[22] Filed: Aug. 12, 1977

[51] Int. Cl.² .............................................. B01D 23/10
[52] U.S. Cl. ...................................... 210/279; 210/291
[58] Field of Search ............... 210/274, 279, 289, 291, 210/497.1; 55/387

[56] References Cited

U.S. PATENT DOCUMENTS

| 417,038 | 12/1889 | Hyatt | 210/279 X |
| 429,688 | 6/1890 | Hyatt | 210/291 |
| 2,579,053 | 12/1951 | Schulstadt | 210/289 X |
| 2,620,892 | 12/1952 | Stover | 55/387 X |
| 3,441,503 | 4/1969 | Smith | 210/279 X |
| 3,734,295 | 5/1973 | Smith et al. | 210/279 X |
| 3,958,634 | 5/1976 | Smith | 210/497.1 X |
| 4,013,556 | 3/1977 | Evans | 210/289 X |

FOREIGN PATENT DOCUMENTS 810,342   3/1959   United Kingdom ..................... 210/291

Primary Examiner—Robert H. Spitzer
Attorney, Agent, or Firm—Joel E. Siegel; Charles M. Kaplan

[57] ABSTRACT

A liquid distribution pipe in liquid treatment apparatus is divided into two separate liquid distribution sections. Each pipe section fits into a separate nozzle on the surface of the apparatus and is independent of the other pipe section. Each section of liquid distribution pipe can be isolated from all other sections, and can supply or withdraw liquid from the apparatus independent of the other sections.

7 Claims, 5 Drawing Figures

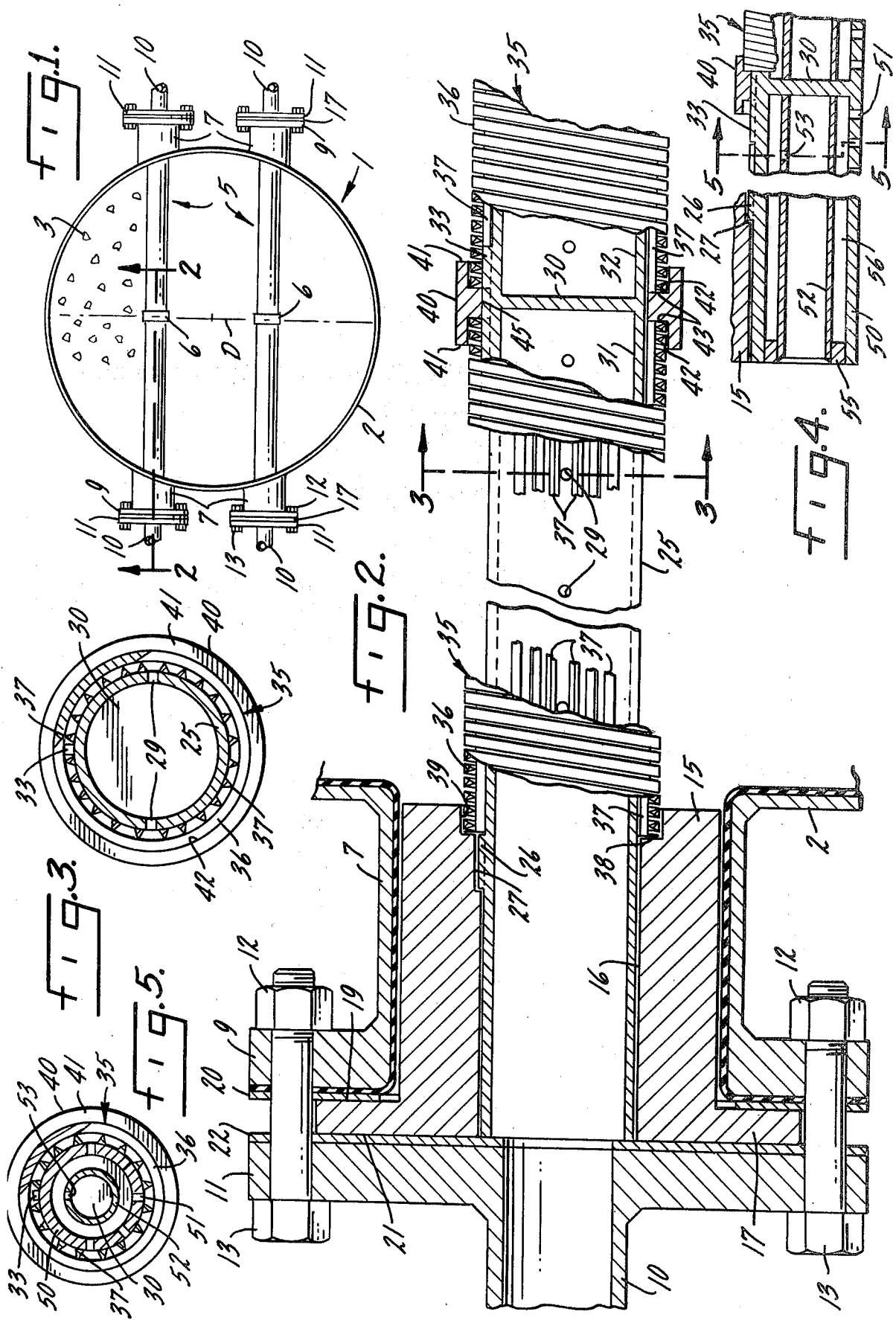

LIQUID TREATMENT APPARATUS

BACKGROUND OF THE INVENTION

This invention relates to liquid treatment apparatus, and more particularly to conduits for distributing liquid to be treated and/or regenerant liquid through granular liquid treating materials, such as ion exchange resins or filter particles.

Such liquid distribution equipment has a limited service life especially in ion exchange regeneration tanks. In the past whenever a small area of well screen wore out, or when a similar failure occurred, the liquid treatment installation had to be shut down while the liquid distributor was repaired. In some prior art designs the entire distributor had to be replaced when such failures occurred, or the liquid distribution laterals were relatively costly to install and maintain because they were welded to a flange or similar part.

SUMMARY OF THE INVENTION

Accordingly, it is an object of this invention to provide liquid treatment apparatus with improved liquid distribution conduits.

Another object is to provide a liquid distribution conduit system that can be partially shut down when a failure occurs.

Another object is to provide liquid treatment equipment with distribution laterals made from separate components that are individually replaceable or repairable.

Another object is to reduce erosion of well screen covering ion exchange regenerant distributors by reducing the velocity of the regenerant liquid flowing through the well screen.

Another object is to reduce chemical consumption costs by providing more uniform distribution of ion exchange regenerant.

Another object is to provide liquid distribution conduits that do not have to be welded to flanges.

Another object is to provide liquid treatment equipment with distribution laterals that are relatively low cost, durable, easily repaired and maintained, and which do not possess defects found in similar prior art devices.

Other objects and advantages of this invention will be revealed in the specification and claims and the scope of the invention will be pointed out in the claims.

DESCRIPTION OF THE DRAWING

FIG. 1 is a top plan cross sectional view of liquid treatment equipment in accord with this invention.

FIG. 2 is an enlarged cross sectional view taken along the line 2—2 in FIG. 1.

FIG. 3 is a cross sectional view taken along the line 3—3 in FIG. 2.

FIG. 4 is a partially broken-away cross sectional view on a reduced scale of another embodiment of the invention.

FIG. 5 is a cross sectional view taken along the line 5—5 of FIG. 4.

DESCRIPTION OF THE INVENTION

The drawing shows liquid treatment apparatus 1 comprising a rubber-lined cylindrical vessel or tank 2 containing granular liquid treatment material 3, such as particles of ion exchange resin or a filter media like sand. Liquid to be treated may enter or leave tank 2 through a pair of identical parallel liquid distribution lateral conduits 5 in accord with this invention. Conduits 5 may also be used to distribute a regenerant liquid, such as sulphuric acid, through ion exchange resin being regenerated in tank 2. The center of each conduit 5 is located at 6 approximately one-third of the distance from the center to the outside of tank 2 on a common diameter D of tank 2.

Each liquid distribution conduit 5 is attached to a pair of aligned nozzles 7 which extend from opposing portions of the surface of tank 2. Each nozzle 7 terminates in a perpendicular circular circumferential flange 9. An incoming or outgoing liquid conduit 10 having a circumferential flange 11 is removably attached to each flange 9 by nuts 12 threaded onto bolts 13 which pass through aligned holes in flanges 9 and 11. A spool 15 essentially fills each nozzle 7 except for a circular opening 16 through its center. A circumferential flange 17 on each spool 15 is perpendicular to the axis of its hole 16. The inner surface 19 of flange 17 abutts nozzle flange 9, and the joint therebetween is sealed by gasket means 20. The outside surface 21 of flange 17 abutts conduit flange 11, and the joint therebetween is sealed by gasket means 22. Suitable valve means (not shown) may independently control liquid flow into or out of each conduit 10.

A unitary cylindrical liquid distribution pipe 25 has each of its identical opposite ends extending into and terminating in one of the circular openings 16 of an aligned pair of spools 15. A longitudinal ridge 26 adjacent each end of pipe 25 is keyed into a longitudinally extending slot 27 adjacent to opening 16 in each spool 15. A plurality of liquid distribution holes 29 are spaced along pipe 25 symetrically with respect to the center line of tank 2. An integral wall 30 perpendicular to the longitudinal axis of pipe 25 spans and closes pipe 25 at its center, and thus defines two identical separated liquid distribution sections 31 and 32, each of which is fed through its own separate nozzle 7. An integral longitudinal rib 33 projects from the exterior surface of pipe 25 across its center.

A pair of identical well screen sleeves 35 telescope over sections 31 and 32 of each pipe 25. Each sleeve 35 is made from a continuous strand 36 of triangular cross sectioned wire spiraled into a hollow cylindrical shape having a plurality of longitudinally extending, triangular cross sectioned support rods 37 attached to its interior surface. The space between rods 37 defines slots into which ribs 33 on pipes 25 are keyed. An end 38 of each sleeve 35 fits into an annular groove 39 in a spool 15, which prevents leakage around such end 38.

A sealing ring 40 surrounds pipe 25 at its center. Ring 40 has a pair of identical flanges 41 that project longitudinally of pipe 25 toward its opposite ends. Flanges 41 and the outside surface of pipe 25 define a pair of annular spaces 42. Each space 42 faces an opposing end of pipe 25 and has a separate end 43 of a sleeve 35 extending thereinto to prevent leakage around such end 43. Ring 40 has a notch 45 that is keyed to rib 33 between the ends of a pair of sleeves 35.

Another embodiment of the invention shown in FIGS. 4 and 5 is identical to the embodiment of FIGS. 2 and 3, except as noted hereafter, so the same reference numerals are used to indicate corresponding parts. An outer liquid distribution pipe 50 has its holes or perforations 51 in its bottom half only. A coaxial inner pipe 52 has its holes or perforations 53 in its top surface only. Pipe 52 is attached at one end to a support ring 55 and to wall 30 at its other end. The space between pipes 50 and 52 defines a liquid velocity reduction chamber 56.

Outer pipe 50 provides the mechanical strength supporting laterals 5, and there may be sufficient holes in pipe 50 to reduce the liquid velocity to a value as low as 5-7 feet/second. This is especially important when distributing regenerant liquids in ion exchangers because it reduces the metal erosion caused by such liquids that has previously resulted in premature well screen failures.

It has thus been shown that by the practice of this invention the liquid distribution lateral conduits 5 in liquid treatment apparatus have isolated sections 31 and 32 that may be shut down independently; this permits continued operation of the rest of the apparatus when failure of a small section of well screen occurs at a time when shut down of the entire apparatus for repair would be relatively costly. Also, flow rates through the different distribution pipe sections may be varied so as to attain optimum operating performance of the apparatus. When a well screen sleeve 35 must be replaced, it is easily removed simply by detaching the appropriate flange 11 and sliding a spool 15 out from in front of such sleeve; yet the entire lateral assembly has sufficient mechanical strength to withstand the hydraulic currents and shock loads encountered in this type of liquid treatment apparatus.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. For example, terms such as top and bottom are intended to express relationships that may change depending on the orientation of the apparatus. It is intended that the appended claims cover all such changes as fall within the true spirit and scope of the invention.

What is claimed is:

1. Liquid treatment apparatus comprising:
   (a) a vessel containing granular liquid treating material and having a pair of aligned nozzles extending from opposing portions of its surface permitting liquid to enter and to leave its interior;
   (b) a pair of spaced aligned spools, each spool essentially filling one of said nozzles except for a circular opening through the center of each spool;
   (c) a unitary cylindrical distribution pipe having each of its opposite ends inserted into and terminating in one of said circular openings in one of said spaced aligned spools, each end of said unitary liquid distribution pipe being removable from the circular hole in the spool in which it is inserted, there being a plurality of liquid distribution holes spaced along said unitary liquid distribution pipe, an integral wall of said unitary liquid distribution pipe spanning and completely closing said unitary liquid distribution pipe at its center so as to define two separated liquid distribution sections in said unitary liquid distribution pipe, each section being fed through its own separate nozzle, an integral longitudinal rib projecting from the exterior surface of said unitary liquid distribution pipe at its center;
   (d) a pair of sleeves of well screen having spaced longitudinal support rods attached to their interior surfaces, each of said screens telescoping over one of the separated liquid distribution sections of said liquid distribution pipe, said rib laying into the space between said support rods on said screens; and
   (e) a sealing ring surrounding said unitary liquid distribution pipe at its center and defining with the outside surface of said unitary liquid distribution pipe a pair of annular spaces into which the ends of said well screens extend and are sealed.

2. The invention defined in claim 1, wherein said spools each have a longitudinally extending slot adjacent to their circular opening and said unitary liquid distribution pipe has a longitudinal ridge at each end keyed into said slots.

3. The invention defined in claim 1, wherein each of said nozzles has a perpendicular circumferential flange, each of said spools has a circumferential flange perpendicular to the axis of its hole, the inner surface of the flange on each spool abutting the flange on its nozzle, and a pair of separate liquid conduits each having a circumferential flange abutting the outside surface of one of said spools and being removably attached to the flange of its nozzle.

4. The invention defined in claim 1, wherein said sealing ring has a notch keyed to said rib between said ends of said well screen.

5. The invention defined in claim 1, wherein each section of said unitary liquid distribution pipe comprises an inner perforated cylindrical pipe completely surrounded by a coaxial outer perforated cylindrical pipe, said inner and outer pipes being separated so as to define a liquid velocity reduction chamber therebetween, the perforations in said inner pipe being only in the top surface thereof and the perforations in said outer pipe being only in the bottom half thereof.

6. Liquid treatment apparatus comprising:
   (a) a cylindrical tank containing granular liquid treating material and having a pair of aligned nozzles extending from opposing portions of its surface permitting liquid to enter and to leave its interior;
   (b) a pair of aligned spools, each spool essentially filling one of said nozzles except for a circular opening through its center, each spool having a longitudinally extending slot adjacent its opening;
   (c) a unitary cylindrical liquid distribution pipe having each of its opposite ends extending into and terminating in said circular opening in one of said aligned spools and an integral longitudinal ridge at each end of said liquid distribution pipe being keyed into one of said slots, an integral longitudinal rib projecting from the exterior surface of said liquid distribution pipe at its center, there being a plurality of liquid distribution holes spaced along said liquid distribution pipe, and a wall perpendicular to the longitudinal axis of said liquid distribution pipe spanning and closing said liquid distribution pipe at its center so as to define two separated identical liquid distribution sections each being fed through its own separate nozzle;
   (d) a pair of sleeves of well screen each having spaced longitudinal support rods attached to its interior surface, said sleeves telescoping over said liquid distribution pipe and said rib keying into the space between said support rods;
   (e) a sealing ring surrounding said liquid distribution pipe at its center and defining with the outside surface of said liquid distribution pipe a pair of said annular spaces, each such space facing an end of said liquid distribution pipe and each space having an end of a separate sleeve of well screen extending thereinto, and said sealing ring having a notch keyed to said rib between the ends of said sleeves; and (f) each of said nozzles having a perpendicular circumferential flange, each of said spools having a circumferential flange perpendicular to the axis of its hole, the inner surface of the flange on each spool abutting the flange on its nozzle, and a pair of separate liquid conduits each having a circumferential flange abutting the outside surface of one of said spools and being removably attached to the flange of its nozzle.

7. The invention defined in claim 6, wherein the center of each liquid distribution pipe is located on the same diameter of said tank approximately one-third of the distance from the center to the outside of said tank.

* * * * *